Patented Mar. 17, 1942

2,276,509

UNITED STATES PATENT OFFICE 2,276,509

METHOD FOR THE SEPARATION OF OPTICALLY ACTIVE α-METHYLPHENETHYLAMINE

Fred P. Nabenhauer, Somerton, Pa., assignor to Smith, Kline & French Laboratories, Philadelphia, Pa., a corporation of Pennsylvania No Drawing. Original application November 3, 1939, Serial No. 302,713. Divided and this application April 23, 1941, Serial No. 389,886

6 Claims. (Cl. 260—570.8)

My invention relates to a novel method for the separation of the optically active isomers of α-methylphenethylamine and it comprises methods wherein the laevo and dextro isomers, in the form of their neutral salts with d-tartaric acid, are separated by fractional crystallization from an alcohol solution of such salts, the neutral d-tartrate of the laevo amine being obtained as a crystalline material, and it more particularly relates to the separation of the laevo isomer, in the form of its neutral salt with d-tartaric acid, and the recovery of the laevo amine, as free base, from such neutral salt; all as more fully hereinafter set forth and as claimed.

It is known in the art (Leithe,—"Ber. d. Chem. Gesell." (1932), page 664) that d-α-methylphenethylamine d-bitartrate may be obtained as a crystalline acid tartrate, from racemic α-methylphenethylamine, by reacting the racemic amine with sufficient d-tartaric acid to form a mixture of the acid tartrates of the d- and l-amine and then fractionally crystallizing the bitartrate of the d-amine from an alcohol solution of the mixture of acid tartrates so obtained. To obtain the d-amine as the free base, the acid tartrate may be decomposed with caustic alkali and the free base recovered by distillation in vacuo. By using l-tartaric acid in such method, the l-α-methylphenethylamine l-bitartrate is obtained as a crystalline material by fractional crystallization. This acid tartrate may likewise be decomposed with alkali to obtain the l-amine as free base.

That is, either dextro or laevo α-methylphenethylamine have been previously obtained from the racemic form by certain known prior methods.

But in such prior methods, the separation of the desired isomer is effected by the fractional crystallization of acid tartrates. And in those methods, d-tartaric acid is used to obtain the dextro amine and l-tartaric acid to prepare the laevo amine.

However, while those prior processes are operable chemically, they have serious disadvantages, particularly with regard to the separation of l-α-methylphenethylamine by means of l-tartaric acid, in that while d-tartaric acid is readily available and comparatively cheap, l-tartaric acid at the present time is both difficult to obtain and expensive in pure form. Thus, by the method outlined above, d-α-methylphenethylamine may be readily and cheaply prepared while the laevo form can only be obtained at great expense.

I have discovered a method by which both optically active forms of α-methylphenethylamine, and especially the laevo form, may be prepared by the use of d-tartaric acid alone. This novel method greatly simplifies the process and makes the therapeutically useful isomers readily available.

Broadly, the method according to this invention comprises the separation of l-α-methylphenethylamine from dl-α-methylphenethylamine by treatment with d-tartaric acid for the production of a mixture of neutral d-tartrates and crystallization from a solution, it having been found that l-α-methylphenethylamine may be readily separated by crystallization from a solution of the neutral d-tartrates.

The method according to this invention may be applied to, for example, racemic α-methylphenethylamine, or to any mixture of the optically active isomers thereof in which the laevo form is present in amount not substantially less than the dextro form.

Again, the method according to this invention is applicable to mixtures rich in the laevo form, such as result from initial separation of the dextro form by methods heretofore known, as, for example, by crystallization from a solution of a mixture of acid d-tartrates.

Where it is desired to effect separation of the laevo form from a mixture rich in the dextro form, it will usually be necessary to first effect separation of a part of the dextro form by methods heretofore known and then to apply the method in accordance with this invention to the remaining mixture.

As will be appreciated, the method in accordance with this invention, while primarily of the greatest advantage for effecting separation of l-α-methylphenethylamine, provides also procedure for the separation of d-α-methylenethylamine.

As more specifically illustrative of the method in accordance with this invention for the separation of the l-enantiomorph form, for example, racemic α-methylphenethylamine, by the use of d-tartaric acid alone and with separation also of d-α-methylphenethylamine, the following procedure may be employed and will be found to be efficient.

Two mols, for example, 270 grams, of racemic α-methylphenethylamine base are reacted with one mol (150 grams) of d-tartaric acid, thereby forming dl-α-methylphenethylamine d-tartrate, a neutral salt. The neutral salt thus obtained is fully dissolved by the addition of sufficient, say about one liter, of absolute ethanol, and heating to about the boiling point. The solution is then allowed to cool to room temperature with occasional stirring to effect crystallization. The crystals are filtered off and will be found to contain a preponderance of the laevo enantiomorph. On recrystallization the preponderance of the l-enantiomorph is increased and the process is repeated until no further change in optical rotation is effected and a reading of $$[\alpha]^{20°}_D = -6.5$$

is obtained in a concentration of 8 grams per 100 cc. of aqueous solution. The product thus obtained is l-α-methylphenethylamine d-tartrate. The residual solid in the mother liquors is repeatedly and systematically crystallized, yielding a further fraction of l-α-methylphenethylamine d-tartrate which may be purified by recrystallization. d-α-methylphenethylamine may be readily recovered from the mother liquors by the addition of tartaric acid thereto for the formation of acid tartrates and separation of d-α-methylphenethylamine d-bitartrate by crystallization.

The free base of either optical isomer may be obtained by addition to the d-tartrate in the case of the laevo isomer and the d-bitartrate in the case of the dextro isomer of alkali in excess, as, for example, by the addition of an aqueous solution of caustic soda, which will cause the base to separate as an oil which may be recovered and purified by any well known procedure.

As a further example, one mol of racemic α-methylphenethylamine base is reacted with 1.2 mols of tartaric acid and the resulting bitartrate is dissolved in, for example, 91% isopropanol, with heating almost to the boiling point. The solution is then allowed to cool to about 60° C. and filtered hot. Repeated crystallization is then carried out until crystals having an optical rotation $$[\alpha]^{20°}_D = +30.8$$

are obtained in a concentration of 8 grams per 100 cc. of aqueous solution. The product thus obtained is pure d-α-methylphenethylamine d-bitartrate. The residual solid in the mother liquors is repeatedly and systematically crystallized, yielding a further fraction of d-α-methylphenethylamine d-bitartrate which may be purified by recrystallization.

The residual solid in the mother liquors now remaining comprises a preponderance of l-α-methylphenethylamine d-bitartrate, which may now be separated by effecting neutralization of the excess of d-tartaric acid present with production of neutral tartrates and effecting separation of the l-α-methylphenethylamine d-tartrate by crystallization.

Neutralization of the excess tartaric acid may be effected where, as in the case of the example above, the mother liquors comprise alcoholic solutions by dividing the total volume of the mother liquors into equal parts, removing, for example, by evaporation, the alcohol from one part, adding excess alkali, liberating the free base, which, as has been indicated, separates as an oil, separating and drying the free base with, for example, caustic potash and then adding the free base to the other portion of the mother liquors with heating to form a solution. Such procedure will result in the formation of a neutral d-tartrate solution. From the solution so formed l-α-methylphenethylamine d-tartrate may be separated by repeated crystallization and the free base may be recovered as described above.

Following the procedure in accordance with this invention, other salts of the optically active isomers may be obtained from the free bases of the isomers by exact neutralization of either base, with an organic or inorganic acid corresponding to the salt desired. Thus, by way of example, any desired organic or inorganic salt of the optically active isomers, in addition to the tartrates initially obtained, as, for example, sulphates, hydrochlorides, oleates, etc., may be obtained, by exact neutralization of either optically active base with the acid corresponding to the desired salt.

Following the procedure according to this invention, it will be apparent that the l-enantiomorph may be initially separated from racemic α-methylphenethylamine, or from any mixture of the optically active isomers in which the dextro form is not in substantial excess; and that following the separation of the laevo form the dextro form may be recovered from the mother liquors by the addition thereto of d-tartaric acid for the formation of acid d-tartrates and crystallization.

Again, as will now be evident, where the l-α-methylphenethylamine is to be separated from a mixture of the optically active isomers in which the dextro form is in substantial excess, or in preponderance, the dextro form will first be separated by crystallization following treatment with d-tartaric acid to form d-bitartrates and the laevo form will then be recovered by crystallization following neutralization with the formation of neutral d-tartrates.

Thus, it will now be understood that the method in accordance with this invention comprises essentially the separation of l-α-methylphenethylamine from racemic α-methylphenethylamine and from various mixtures of d- and l-α-methylphenethylamine in which the laevo form is present in amount not substantially less than the dextro form with the use of d-tartaric acid for the formation of neutral d-tartrates and separation of l-α-methylphenethylamine d-tartrate by crystallization, whether the procedure be for the initial separation of l-α-methylphenethylamine d-tartrate, as from racemic α-methylphenethylamine, or a mixture in which the dextro form is not in substantial excess, or is preceded by preliminary separation of the dextro form by known methods, as in the case of mixtures in which the dextro form predominates.

It will be understood that proceeding in accordance with this invention the free base l-α-methylphenethylamine may be readily obtained from the l-α-methylphenethylamine d-tartrate by treatment of the d-tartrate with alkali in excess, resulting in separation of the free base as an oil which may be recovered and purified by any well known method.

This application is a division of application filed by me, Serial No. 302,713, filed November 3, 1939.

What I claim and desire to protect by Letters Patent is:

1. The steps in the method for the separation of the optically active isomers of d- and l-α-methylphenethylamine from a material composed of d- and l-α-methylphenethylamine, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate and separating d-α-methylphenethylamine d-bitartrate by crystallization.

2. The steps in the method for the separation of the optically active isomers of d- and l-α-methylphenethylamine from a mixture of d- and l-α-methylphenethylamine in which d-α-methylphenethylamine is not present in substantial excess, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate and separting d-α-methylphenethylamine d-bitartrate by crystallization.

3. The steps in the method for the separation of the optically active isomers of d- and l-α-methylphenethylamine from a racemic mixture of d- and l-α-methylphenethylamine, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate and separating d-α-methylphenethylamine d-bitartrate by crystallization.

4. The steps in the method for the separation of the optically active isomers of d- and l-α-methylphenethylamine from a materal composed of d- and l-α-methylphenethylamine, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate, separating d-α-methylephenethylamine d-bitartrate by crystallization and liberating d-α-methylphenethylamine from the d-α-methylphenethylamine d-bitartrate.

5. The steps in the method for the separation of the optically active isomers of d- and l-α-methylphenethylamine from a mixture of d- and l-α-methylphenethylamine in which d-α-methylphenethylamine is not present in substantial excess, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate, separating d-α-methylphenethylamine d-bitartrate by crystallization and liberating d-α-methylphenethylamine from the d-α-methylphenethylamine d-bitartrate.

6. The steps in the method for the separation of the optically active isomers of d- and l-α-methylphenethylamine from a racemic mixture of d- and l-α-methylphenethylamine, which comprises reacting the mixture with d-tartaric acid in proportion to produce a mixture of neutral d- and l-α-methylphenethylamine d-tartrates, separating l-α-methylphenethylamine d-tartrate from the mixture by crystallization, adding d-tartaric acid to the mother liquor to produce d-bitartrate, separating d-α-methylphenethylamine d-bitartrate by crystallization and liberating d-α-methylphenethylamine from the d-α-methylphenethylamine d-bitartrate.

FRED P. NABENHAUER.